US007155509B1

(12) United States Patent
Cordsmeyer et al.

(10) Patent No.: US 7,155,509 B1
(45) Date of Patent: Dec. 26, 2006

(54) SYSTEM AND METHOD FOR RELIABLY PURGING A FAULT SERVER

(75) Inventors: Joel E. Cordsmeyer, Tucker, GA (US); Frederick Edwards, Ellenwood, GA (US); Robert J. Bates, Cumming, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 729 days.

(21) Appl. No.: 10/082,864

(22) Filed: Feb. 26, 2002

(51) Int. Cl.
*G06F 15/173* (2006.01)

(52) U.S. Cl. .................................. 709/224; 707/206
(58) Field of Classification Search ................ 709/224; 711/170; 714/2; 707/206
See application file for complete search history.

(56) References Cited

U.S. PATENT DOCUMENTS 6,347,374 B1 * 2/2002 Drake et al. ................ 713/200
6,356,917 B1 * 3/2002 Dempsey et al. ........... 707/202
6,571,260 B1 * 5/2003 Morris ....................... 707/206
6,571,285 B1 * 5/2003 Groath et al. ............... 709/223
6,629,113 B1 * 9/2003 Lawrence ................... 707/206
6,721,791 B1 * 4/2004 Qiao .......................... 709/224

OTHER PUBLICATIONS

NavisXtend Statistics Server Guide (Lucent Technologies, Revision 04, Nov. 1999), pp. 1-15 thru 1-17, pp. 4-25 thru 4-26, Appendix D—Database Sizing.*

* cited by examiner

*Primary Examiner*—William Vaughn
*Assistant Examiner*—Greg Bengzon
(74) *Attorney, Agent, or Firm*—Withers & Keys, LLC

(57) ABSTRACT

Improvements to existing trap-generated message memory purge procedures and processes are shown and described. The improvements may be implemented in a telecommunications system having a plurality of managed elements, each of the managed elements potentially generating traps which are communicated to one or more fault servers.

6 Claims, 2 Drawing Sheets

SYSTEM AND METHOD FOR RELIABLY PURGING A FAULT SERVER

I. BACKGROUND

A. Field of the Invention

Figure 1:
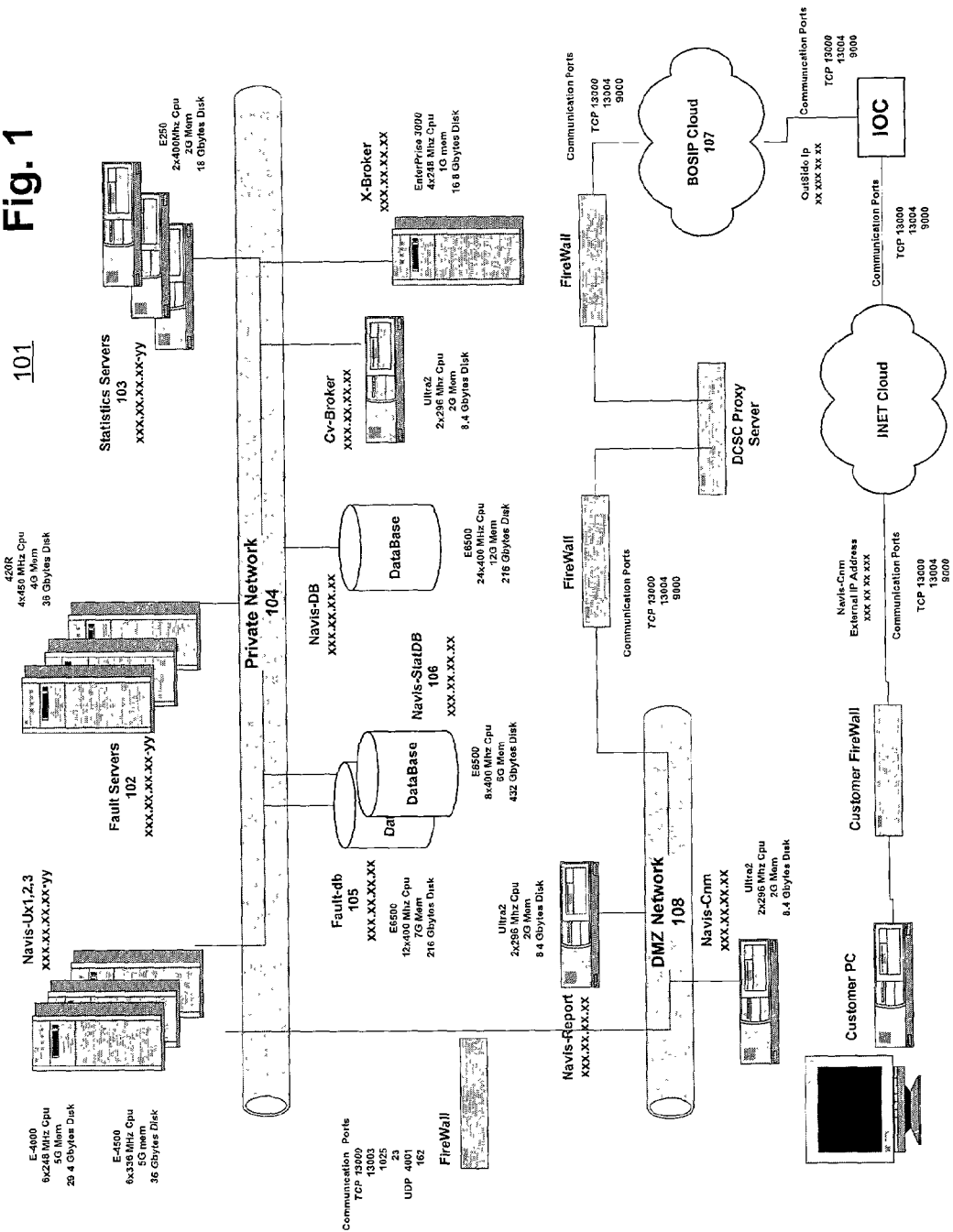

This invention relates generally to the field of network management, and more particularly to maintenance operations on elements within a managed telecommunications network.

B. Copyright Notice/Permission

A portion of the disclosure of this patent document contains material that is subject to copyright protection. The copyright owner has no objection to the reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright. COPYRGT.2001-002, BellSouth Intellectual Property Management Corporation.

C. Description of the Related Art

Telecommunications companies (i.e., service providers) build, operate, and maintain very large communications and related networks. Part of the operation and maintenance of these networks involves the use of operations software, typically divided into a number of functional areas such as engineering, provisioning, and the like. Provisioning software aids service providers in receiving requests for service or alterations to existing service, be it voice and/or data, and configuring both the telecommunications network and/or related networks and systems (e.g., accounting, billing, and the like) to provide the new service requested. Engineering operations software in contrast is typically used by service providers to configure and monitor network elements to ensure they perform their functions properly. Service providers also use engineering operations software to facilitate service provisioning and monitoring.

One of the primary engineering operations software systems is the element management system (EMS) software. Typical EMS packages are centralized service network management applications that manage and control (typically via standards such as SNMP and the like) the various elements in the telecommunications and/or related networks. Within the core telecommunications network the elements often are multiservice elements such as frame relay, SMDS, ATM, IP, and/or the like switches. Some of the operations performed by typical EMS packages include: circuit provisioning to establish end-to-end network connectivity; logical provisioning of individual circuits and to establish network-wide parameters; providing audit trails on activities such as the length of a user session and the addition or modification of switches, logical ports, trunks, circuits, and the like; display of network statistics for real-time status information on logical and physical ports; display of usage data on logical and physical ports and the like for network planning and trend analysis; and collecting different types of traps for alarm indications and statistics logging for the numerous objects in the telecommunications networks (e.g., switches, trunks, physical ports, logical ports, permanent virtual circuits, switched virtual circuits, and the like).

With regard to traps in particular, the EMS package typically reports all traps from the various elements in the network being managed to a central repository comprised of one or more fault servers and/or related databases. However, with the explosive growth in demand for telecommunications services over the past few years the number of elements within the service providers' networks have dramatically increased. As a result, the number of faults occurring in service providers' networks has swelled, thereby generating so many traps at a such a rapid pace that existing systems and methods of collecting, analyzing, and managing these traps have been overwhelmed. Accordingly, there is a need for improved systems and methods of collecting and managing traps in telecommunications and/or related networks.

II. SUMMARY OF THE INVENTION

In a telecommunications system having a plurality of managed elements, each of the managed elements potentially generating traps which are communicated to one or more fault servers, an improved fault message purge procedure, the improvement comprising an increased rowcount, the increased rowcount corresponding to approximately 45,000 rows in a trap-generated message memory for approximately every 15 traps received at the one or more fault servers. The purge procedure may call a purge script residing in the one or more fault servers. The purge procedure may also be initiated by a second script residing in a UNIX segment of the one or more fault servers. Existing purge procedures are improved by monitoring one or more of any processes contained within the purge procedure and restarting the purge procedure upon detection of any errors in the processes.

III. BRIEF DESCRIPTION OF THE DRAWINGS

Figure 2:
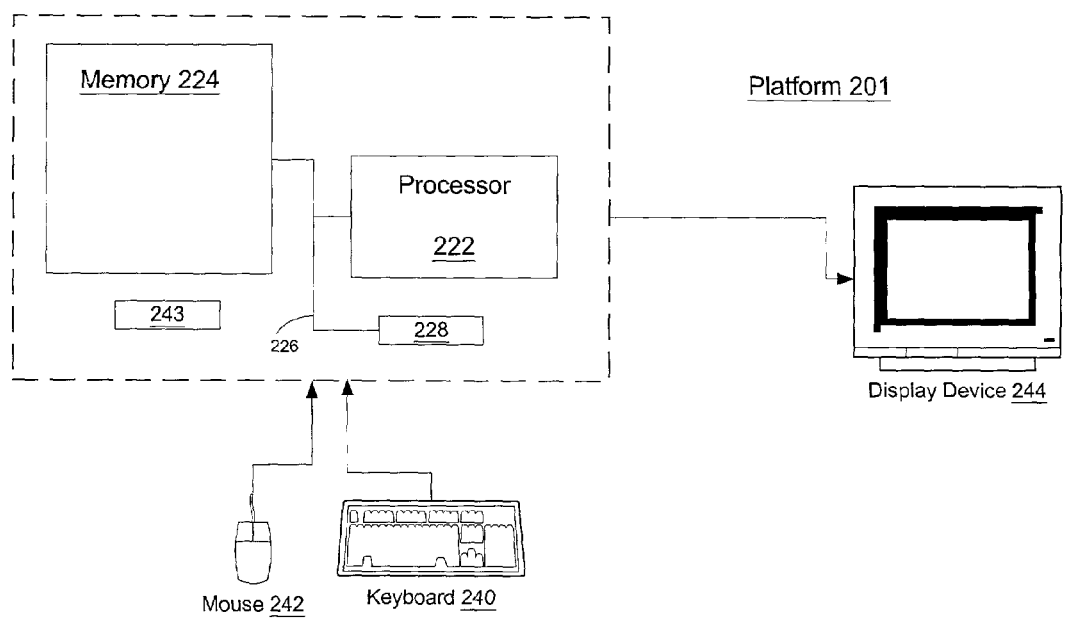

These and other features, aspects, and advantages of the invention will become better understood in connection with the appended claims and the following description and drawings of various embodiments of the invention where:

FIG. 1 illustrates and an exemplary network within which the invention may be implemented; and FIG. 2 illustrates the structure of an exemplary server that may reside within a network such as that illustrated in FIG. 1.

IV. DETAILED DESCRIPTION OF THE PREFERRED EMBODIMENTS

Throughout the following detailed description similar reference numbers refer to similar elements in all the figures of the drawings.

FIG. 1 illustrates an exemplary network 101 in which the invention may be implemented. Network 101 is based in part on the EMS developed and marketed by Lucent Technologies of Murray Hill, N.J. under the trademark NAVISCORE. The NAVISCORE EMS is a distributed multiservice element manager that utilizes a graphically integrated UNIX-based platform and telecommunications network management (TNM) standards to perform its network management and control functions. Network 101 also includes portions of a suite of management servers developed and marketed by Lucent Technologies under the trademark NAVISEXTEND ENVIRONMENT. The NAVISEXTEND ENVIRONMENT extends the functionality of the NAVISCORE EMS. Network 101 as depicted includes a plurality of fault servers 102 and statistics servers 103 operatively connected to a private network 104. Network 101 also includes a fault database 105 and a statistics database 106 operatively connected to private network 104. As will be understood by one skilled in the art, network 101 need not include many of the elements depicted therein (e.g., statistics servers 103, firewalls, DMZ network 108, and the like), and may include any number of other elements not depicted in FIG. 1 (e.g., provisioning servers, accounting servers, and the like).

In operation, whenever a switch or managed network element (not shown) in the telecommunications network 107 experiences a fault it generates a trap. The trap is subsequently communicated from the network element to at least one of the fault servers 102 via a demilitarized zone (DMZ) network and the private network 104. The fault server 102 converts the trap into an English language-type message (not shown) that typically includes information such as the type of error experienced by the network element, a date and time the error occurred, the particular network element that experienced the error (e.g., by network address such as an IP address), and the like. In some of the assignee of the present invention's networks, receipt of 50–100 traps per second at the fault servers 102 is not unusual. The English language-type message is then sent by the fault server 102 to the fault database 105 via the private network 104, where the message is stored and may be accessed by other systems in the network for analysis, troubleshooting, and the like.

While one skilled in the art will understand that servers 102 may be implemented in any number configurations on any number of computing platforms, FIG. 2 illustrates a generic computing platform 201 for servers 102. As shown, computing platform 201 includes processing unit 222, system memory 224, and system bus 226 that couples various system components including system memory 224 to the processing unit 222. The system memory 224 might include read-only memory (ROM) and/or random access memory (RAM). The platform 201 might further include a hard-drive 228, which provides storage for computer readable instructions, data structures, program modules, other data, and the like. A user may enter commands and information into the platform 201 through input devices such as a keyboard 240 and pointing device 242. A monitor 244 or other type of display device may also be connected to the platform 201 for visual output. Communications device 243, which may be for example a TCP/IP enabled device, provides for connectivity to other computing devices within or beyond network 101 illustrated in FIG. 1. Processor 222 may be programmed with instructions to interact with other computing systems so as to perform the algorithms and operations described below. Processor 222 may be loaded with any one of several computer operating systems such as Windows NT, Windows 2000, Linux, and the like. In a particular embodiment of the invention, processing unit 222 comprises a 4×450 MHz CPU, system memory 224 comprises 4 Gigabytes of RAM, hard-drive 228 comprises a 36 Gigabyte disk-drive, and processor 222 includes a UNIX segment.

Because the information contained in the stored messages generated from the traps becomes stale at some point and the amount of storage space in the fault database 105 is necessarily limited, a purge script is run periodically to expunge a predetermined number of older error messages stored in the fault database 105. In one configuration of the fault servers 102 the purge script calls on a Sybase stored procedure that resides in a UNIX-based segment of fault database 105. Optimally, older error messages would be kept for the duration of their usefulness while no fresh error messages would be lost due to insufficient storage space in the fault database 105. The developers of existing purge scripts however failed to anticipate the sheer number of traps likely generated by the elements in service providers' networks. The existing purge scripts therefore failed to allocate enough system resources to handle the volume of traps generated in current networks, failed to purge an adequate number of stale messages stored in the fault servers, and/or failed to provide for the appropriate periodicity of execution.

We have determined a number of ways that existing purge scripts may be improved so that a more appropriate number of stale or older stored messages are expunged, a more appropriate number of newly generated messages from traps are retained in memory, and the periodicity of the purge process is adjusted to ensure no system errors are generated because insufficient system resources are available to the purge process and/or the process is overwhelmed by the sheer number of messages being generated in response to traps received from the various networks. Typically memory within a database or memory table is allocated by row. We have determined that in a database or memory where a row comprises approximately 1 kilobytes of memory for alarms and about 1.5 kilobytes of memory for traps (generated from alarms), and there is approximately 5 Gigabytes of memory allocated for storage of up to ten days worth of traps and alarms, purging the last 45,000 rows of memory will free adequate storage space where a fault server(s) receives approximately 15 traps per second from the various networks reporting to it, and where the purge process or script is run approximately hourly. For example, in one embodiment of the invention where the fault servers 102 are receiving approximately 50–100 traps per second, the purge script is run hourly with a rowcount set to free or return up to 1,500,000 rows of memory in fault database 105. Pseudocode for a revised purge script ("fs_purge.script") appears in Appendix A attached hereto. In an exemplary embodiment of the invention a Unix script ("fsPurge.sh") residing in a UNIX segment of fault servers 102 is the procedure that calls or initiates the purge script ("fs_purge-.script") which resides in the fault database 105. Pseudocode for exemplary "fsPurge.sh" instructions is attached hereto as Appendix G.

Another improvement we have determined can be made to existing purge procedures is the addition of instructions to the procedure or process that initiates the purge script. Some of these additional instructions count each insertion and deletion of a trap-generated message from memory in hourly periods and then place the data gathered in a log file ("fs_inserts.script", "fs_stats.script", and "fs_stats_hr-.script"). This insertion and deletion data subsequently may be analyzed for troubleshooting or optimization of the purge process. Pseudocode for exemplary embodiments of these additional instructions appear in Appendices B, C, and D attached hereto.

Another set of additional instructions that may be added to the purge procedure is a script that monitors the fault server processes related to purging operations and automatically restarts them if problems are detected such as a fault database deadlock message. Pseudocode for exemplary embodiments of these additional instructions ("fault_cron" and "check_insert.sh") appear in Appendices E and F attached hereto. Note that these two scripts monitor the log file noted above in conjunction with the fs_inserts and fs_stats scripts.

Note that the exemplary embodiments of the invention illustrated in the various appendices attached hereto are designed for the purge procedure to be run hourly, preferably every hour on the hour. Note also that instructions for the exemplary embodiments depicted in the appendices also provide for the purge procedure to restart up to ten times, separated by one minute intervals, in the case of fatal errors. This helps to ensure that a complete purge is completed even if the purge script and/or the procedure it calls deadlocks or is killed by the server or database respectively.

While the invention has been described in connection with various exemplary embodiments depicted in the various figures and appendices, it is to be understood that other embodiments may be used or modifications and additions may be made to the described embodiments for performing the same function of the invention without deviating therefrom. The invention therefore should not be limited to any single embodiment, whether depicted herein or not. Rather, the invention should be accorded the full breadth and scope encompassed by the claims appended below.

We claim:

1. In a network environment where messages relating to faults that occur in the network over time are stored as rows in a database having a finite amount of memory allocated for storing the messages, a fault message purge procedure, comprising:

expunging a predetermined number of the rows in the database at the end of a current period;

determining the predetermined number prior to beginning the step of expunging by:

determining a rate at which the messages are being stored in the database for the current period, a size of the rows in the database, the finite amount of memory allocated for storing the messages in the database, a period at which the computer code is executed, and a period of time for which information relating to the faults is to be retained in the database;

applying a purge script that specifies that the predetermined number of the rows to be expunged is 45,000 where the rate at which the messages are stored in the database is 15 per second, the size of the rows in the database is 1.5 kilobytes, the finite amount of memory allocated for storing the messages in the databases is 5 gigabytes, the period at which the computer code is executed is once per hour, and the period of time for which information relating to the faults is to be retained is 10 days, the purge script further specifying that when the rate at which the messages are stored in the database increases to 50 per second for the current period, then the predetermined number is increased to 1,500,000; and counting each message saved and expunged from the memory during a time period, wherein the count of saved and expunged messages are utilized for performance analysis.

2. The procedure of claim 1 comprising maintaining a log file of all the messages saved to and expunged from the database.

3. The procedure of claim 1 comprising monitoring the expunging of the messages from the database to ensure that the expunging of the messages from the database functions properly.

4. The procedure of claim 3 further comprising re-executing the step of expunging if the expunging of the messages from the database does not function properly.

5. The procedure of claim 1 wherein the network comprises a telecommunications network.

6. The procedure of claim 5 wherein the memory contains an executable computer code for performing the expunging and further comprises a fault database.

* * * * *